United States Patent [19]

McGovern et al.

[11] 4,370,222

[45] Jan. 25, 1983

[54] FCC REGENERATION

[75] Inventors: Stephen J. McGovern, Deptford; John H. Yeigh, Jr., Turnersville, both of N.J.

[73] Assignee: Mobil Oil Corporation, New York, N.Y.

[21] Appl. No.: 239,776

[22] Filed: Mar. 2, 1981

[51] Int. Cl.$^3$ ............................................. C10G 11/18
[52] U.S. Cl. .................................. 208/113; 208/120; 208/164; 252/416; 252/419
[58] Field of Search ................ 208/113, 120; 252/416, 252/419

[56]     References Cited
U.S. PATENT DOCUMENTS 2,225,402 12/1940 Liedholm .
2,386,491 10/1945 McOmie .
2,883,335  4/1959 Smith .
3,223,650 12/1965 Van Pool .
3,563,911  2/1971 Pfeiffer et al. .
4,051,069  9/1977 Bunn et al. ...................... 208/120 X
4,064,039 12/1977 Penick .
4,176,084 11/1979 Luckenbach .
4,243,634  1/1981 Vickers .
4,304,659 12/1981 Pratt et al. ...................... 252/419 X Primary Examiner—Delbert E. Gantz
Assistant Examiner—G. E. Schmitkons
Attorney, Agent, or Firm—Charles A. Huggett; Michael G. Gilman; Charles J. Speciale

[57]     ABSTRACT

In a fluid catalytic cracking process, the regeneration temperature can be eliminated as an operating constraint, catalyst losses can be held constant or reduced, carbon on regenerated catalyst can be reduced and the coke burning capacity of the regenerator can be increased by the combination of cooling the hot regenerated catalyst and increasing the oxygen content of the inlet regeneration air.

6 Claims, 4 Drawing Figures

# FCC REGENERATION

BACKGROUND OF THE INVENTION

1. Field of the Invention

This invention relates to improvements in the regeneration of fluid catalytic cracking catalyst. More particularly, it relates to reducing fluid catalytic cracking regenerator temperature, catalyst emission losses and carbon on regenerated catalyst. This invention especially relates to the use of oxygen enriched regeneration gas and the cooling of regenerated catalyst in a fluid catalytic cracking unit.

2. Description of the Prior Art

The fluidized catalytic cracking of hydrocarbons is well known in the prior art to produce gasoline, heating oil and diesel fuel. Normally in such processes a hydrocarbon charge, such as a vacuum gas oil, is contacted with hot, regenerated solid catalyst particles either in a fluidized bed reaction zone or an elongated riser reaction zone under cracking conditions for conversion of the hydrocarbon charge into cracked hydrocarbon products with the concommitant deposition of carbonaceous materials (coke) upon the catalyst; separating the cracked hydrocarbon vapors from the coke contaminated catalyst (spent catalyst) within the reaction zone, recovering the cracked hydrocarbon vapors as product essentially free from entrained catalyst, stripping volatile hydrocarbons from the spent catalyst by contact with stripping vapors in a stripping zone; regenerating the coke contaminated stripped catalyst in a regeneration zone by burning coke from the catalyst with a molecular oxygen-containing regeneration gas at an elevated temperature for restoring activity to the regenerated catalyst; and contacting hot, regenerated catalyst with additional hydrocarbon charge in the reaction zone, as described above.

The catalyst and the hydrocarbon charge are maintained at an elevated temperature for a period of time sufficient to effect the desired degree of cracking to lower molecular weight hydrocarbons typical of those present in motor gasoline and distillate fuels.

During the cracking reaction, coke is deposited on the catalyst particles in the reaction zone thereby reducing the activity of the catalyst for cracking and the selectivity of the catalyst for producing gasoline blending stock. In order to restore a major portion of its activity to the coke contaminated or spent catalyst, the catalyst is transferred from the reaction zone to a regeneration zone wherein the catalyst is contacted with a molecular oxygen-containing regeneration gas, such as air, under conditions sufficient to burn at least a portion, preferably a substantial portion, of the coke from the catalyst. The regenerated catalyst is subsequently withdrawn from the regeneration zone and is reintroduced into the reaction zone for reaction with additional hydrocarbon feed. Commonly, spent catalyst from the reaction zone is passed therefrom to a stripping zone for removal of strippable hydrocarbons from the catalyst particles prior to transferring the catalyst to the regeneration zone.

Typically, regeneration zones of the prior art comprise large vertical cylindrical vessels wherein the spent catalyst is maintained as a fluidized bed by the upward passage of a molecular oxygen-containing regeneration gas. The fluidized catalyst forms a dense phase catalyst bed in the lower portion of the vessel and a dilute catalyst phase containing entrained catalyst particles in the upper portion of the vessel with an interface existing between the two phases. Flue gas, which normally comprises gases arising from the combustion of the coke on the spent catalyst, inert gases such as nitrogen from air, any unconverted oxygen and entrained catalyst particles, is then passed from the dilute catalyst phase into a solid-gas separation means within the regeneration zone to prevent excessive losses of the entrained catalyst particles. The catalyst particles separated from the flue gas are returned to the dense phase catalyst bed. A substantially catalyst-free flue gas may then be passed from the separation means to equipment downstream thereof, such as a plenum chamber, for discharge from the top of the regeneration zone. Cyclone separators are commonly used as such separation means.

The fluid catalytic cracking processes in use today conventionally employ catalysts of the crystalline aluminosilicate type. Such catalysts usually comprise an amorphous matrix such as silica-alumina and the like plus a minor portion of a crystalline aluminosilicate having uniform pore openings which have been ion exchanged with rare earth ions, magnesium ions, hydrogen ions, ammonium ions and/or other divalent and polyvalent ions for reduction of the sodium content of the crystalline aluminolsilicates. These cracking catalysts are conventionally known in the art as "zeolite catalysts" and are commercially available. Although these catalysts are subject to physical change, manifested as loss of crystallinity, from exposure to excessively high temperatures, it has been found that they may be subjected to temperatures of up to about 1500° F. without substantial damage to the physical structure of the catalyst. Thus, regeneration process variables may be adjusted to properly achieve the desired residual carbon content on the regenerated catalyst within the above temperature limitation.

Since hydrocarbon cracking is an endothermic process and the burning of the coke from the spent catalyst is an exothermic process, most fluid catalytic cracking processes are designed to be heat balanced. That is, the burning of the coke in the regenerator supplies enough heat, even taking losses into account, to satisfy all of the heat requirements of the reactor. There is a definite relationship between the amount of coke produced during cracking, the amount of coke burned off during the regeneration and the heat which the reactivated heated catalyst returns to the cracking process effected in the reactor. Even this combination of relationships is not wholly independent and controllable because they are in turn partially influenced by the nature of the catalyst and its tendency to make more or less coke under given cracking conditions, as well as the nature of the petroleum fraction feed and its tendency to be converted to more or less coke under a given set of cracking conditions.

It has been, in the past, the usual commercial practice to carefully balance all of the effects and countereffects in a fluid catalytic cracking system and to adjust feeds, residence times, catalyst and other operating conditions to achieve a heat balanced operation. Thus, the type of feed, the feed rate, the feed temperature, the type of catalyst, catalyst to oil ratio, contact time, reaction temperature and other variables are adjusted on the cracking side so as to produce as desirable a product slate as possible while depositing a sufficient amount of coke on the catalyst to satisfy the heat requirements of the system. In the regenerator, adjustments are made to the air inlet temperature, rate of air flow, ratio of $CO_2$ to CO and flue gas composition to provide the required heat balance.

Increasing or varying oxygen content of the regeneration gas introduced to the regenerator has been employed heretofore. U.S. Pat. No. 2,225,402 of Liedholm discloses improved catalyst reactivation utilizing a space velocity of at least 30 through the catalyst, a minimum pressure of at least two atmospheres and an oxygen concentration varying from 2.1 mole % at the beginning of the regeneration of 1.2% at the end. U.S. Pat. No. 3,563,911 of Pfeiffer et al. discloses a multistage fluidized catalyst regeneration process employing air, oxygen or oxygen-enriched air in all of the several stages. U.S. Pat. No. 4,176,084 of Luckenbach teaches that the poisoning effect of metal contaminants deposited on a catalyst may be reduced by periodically increasing the oxygen in excess of that which is required to completely burn the coke to $CO_2$. This may be achieved by increasing the rate of oxygen charged to the regenerator while maintaining the fresh feed and catalyst circulation rates constant or by maintaining the oxygen rate through the regenerator constant while decreasing the fresh feed and catalyst recirculation rates. This excess oxygen introduction may be employed for periods of up to 20% of the regeneration time.

Catalytic cracking catalyst coolers have been employed heretofore. U.S. Pat. No. 2,386,491 of McOmie discloses the use of a catalyst cooler located external to the regenerator while U.S. Pat. No. 3,223,650 of Van-Pool uses indirect heat exchange coils within the regenerator. U.S. Pat. No. 4,064,039 of Penick removes the excess heat generated during the regeneration of a coked catalyst which has incorporated therein a platinum group metal to promote the conversion of CO to $CO_2$. In Penick the hot regenerated catalyst may be cooled by either direct or indirect means and may be effected either within the regenerator or external thereto. In one preferred technique a portion of the catalyst is withdrawn from the regenerator, passed through an indirect water cooled heat exchanger and reintroduced into the regenerator. In another configuration, the hot regenerated catalyst is subject to indirect heat exchange while it is passing from the regenerator back to the reactor. In still another embodiment internal cooling of the catalyst in the regenerator is accomplished by providing water cooling for the cyclone separators in the upper portion of the regenerator vessel.

The operation of the regenerator in many fluid catalytic cracking units is presently constrained by metallurgical temperature limitations, air blower capacity and/or excessive catalyst losses due to high vapor velocities within the regenerator. As feedstocks to fluid catalytic cracking units become heavier, regenerator capacities to handle the increased coke loading will further limit the throughput or the severity of these fluid catalytic cracking units.

It is an object of this invention to reduce fluid catalytic cracking regenerator operating temperatures, reduce catalyst emission losses and reduce the carbon on regenerated catalyst.

It is another object of this invention to operate a fluid catalytic cracking unit at a higher conversion rate, at a higher fresh feed rate and/or with feed streams of higher coke-making tendencies.

SUMMARY OF THE INVENTION

In accordance with the present invention, it has been found that by providing cooling of hot regenerated catalytic cracking catalyst either internal or external to the regenerator vessel in conjunction with an increase in the oxygen content of the inlet regeneration air, the regeneration temperature can be eliminated as an operating constraint, catalyst losses may be held constant or reduced by maintaining or reducing gas velocity through the regenerator, carbon on regenerated catalyst can be significantly reduced and the coke burning capacity of the regenerator can be increased.

The process of this invention is described as an improvement in a fluidized catalytic cracking process of the type wherein a hydrocarbon feedstock is contacted with cracking catalyst in a reactor vessel under catalytic cracking conditions producing cracked hydrocarbon vapors and coke-contaminated catalyst and wherein said coke-contaminated catalyst is regenerated in a regenerator vessel at a predetermined elevated temperature with a molecular oxygen-containing regeneration gas passing through said regenerator vessel at a predetermined superficial velocity producing regenerated catalyst and a flue gas comprising oxides of carbon, which comprises:

(a) introducing oxygen-enriched air into the regenerator vessel as the molecular oxygen-containing regeneration gas, (b) passing said oxygen-enriched air through said regenerator vessel at substantially the same predetermined superficial velocity, whereby the predetermined elevated temperature in the regenerator vessel is increased, and (c) cooling at least a portion of the regenerated catalyst from the increased elevated temperature to provide the regenerated catalyst at substantially the same predetermined elevated temperature.

BRIEF DESCRIPTION OF THE DRAWINGS

All of the drawings show the effect on various process parameters caused by increasing the oxygen content of the inlet regeneration gas in a fluid catalytic cracking unit having a fresh feed design rate of 100,000 B/SD.

DESCRIPTION OF THE PREFERRED EMBODIMENTS

Figure 1:
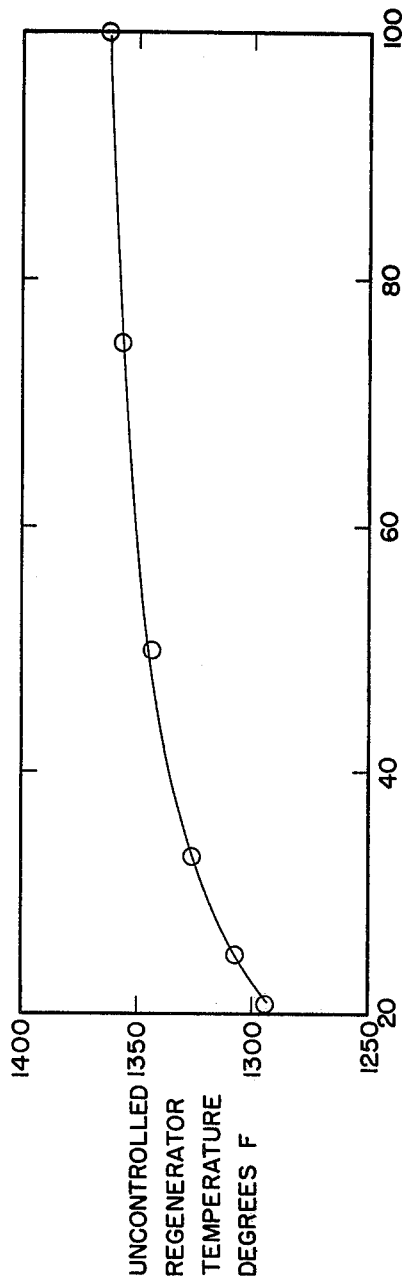
FIG. 1 shows the relationship of uncontrolled regenerator temperature and the oxygen content of the regeneration gas.

The present invention can be incorporated into existing units as part of a bottle-neck removal program or can be included in the design of a grass roots plant for a potential saving in investment costs. Briefly, this invention may be described as increasing the oxygen content of the regeneration air introduced into the regenerator of a fluid catalytic cracking unit and cooling the regenerated catalyst to remove the excessive heat generated by the higher oxygen content regeneration gas, assuming constant superficial gas velocity and regeneration temperature. It is possible, however, by utilizing the improvements of this invention to reduce the superficial gas velocity through the regenerator when higher oxygen content gas is employed which will reduce the amount of cooling required to maintain a constant regeneration temperature.

Many fluid catalytic cracking units have sufficient excess capacity in vessels, piping, pumps, heat exchangers, furnaces, and other attendant equipment to accommodate a significantly increased feed rate to the unit. However, because of severe heat balance constrictions, the desired feed rate increase often cannot be achieved. The catalyst regenerator and its attendant equipment may be the limiting factor when increased feed rate is desired. Metallurgical requirements can limit the maximum temperature at which the regenerator may be operated. In addition, the blower supplying regeneration air to the regenerator may be capacity limited. Further, even where additional blower capacity is available, catalyst losses in the flue gas due to high gas velocities within the regenerator may prevent increasing the fresh feed rate.

The subject invention is directed to improvements in the regeneration portion of the fluid catalytic cracking process whereby throughput may be increased at a significantly reduced investment. The first phase of this improvement is to increase the oxygen content of the air introduced into the regenerator. At constant regenerator gas velocity, oxygen enrichment will increase the potential coke burning capacity of the unit which in turn will permit operation at a higher conversion, at higher fresh feed rate and/or with poorer quality feed, i.e., a higher coke-making gas oil. The increased coke burning within the regenerator occasioned by the use of oxygen enriched air, results in higher temperatures within the regenerator. These higher temperatures may create metallurgical problems within the regenerator and may also result in an upset of the heat balance between the regenerator and the reactor of the FCC unit. The second facet of this invention is directed to correcting these problems. Cooling the regenerated catalyst can return the regeneration temperature to the predetermined temperature utilized theretofore and maintain the unit in a heat balanced condition. Where air blower capacity is a problem or catalyst emission losses are excessive, the improvements of this invention can result in an alleviation of these problems. Briefly, by utilizing oxygen enrichment and by maintaining a constant total oxygen flow rate, the flow rate of the gas to the regenerator can be decreased with a resultant reduction in the superficial gas velocity through the regenerator and, consequently, a reduction in the catalyst losses in the flue gas from the regenerator. Air blower horsepower requirement is thereby reduced because of the reduction in total gas flow rate. An additional benefit of these improvements is that carbon on regenerated catalyst can be significantly reduced in a constrained regenerator operation. These lower carbon levels lead to a higher effective catalyst activity with resultant improvements in the gasoline yield and quality.

It is common practice in commercial fluid catalytic cracking units to employ air as the molecular oxygen-containing regeneration gas. When utilizing the improvements of the subject invention, air having an enriched oxygen content must be utilized. This may be achieved by continuously injecting quantities of oxygen from an oxygen supply into the suction or the discharge of the air blower supplying regeneration gas to the regenerator. The oxygen should be supplied so as to provide oxygen-enriched air to the regenerator, i.e., to increase the oxygen content of the air to the regenerator above the 21 mole % oxygen content of air. Preferably, the oxygen content should be in the range of about 22 to about 35 mole %, most preferably about 23 to 26 mole %. By adjusting the quantities of oxygen being introduced into the regeneration air and the rate of cooling of the catalyst, the desired regeneration temperature, coke burning rate, carbon on catalyst and other parameters may be readily controlled. This heat removal is accomplished in accordance with the improvements of this invention by either removing heat from the regenerated catalyst or from the flue gas leaving the regenerator vessel. The heat removal techniques disclosed in U.S. Pat. No. 4,064,039 may be employed here and the contents of this specification are incorporated herein by reference. Briefly these techniques involve withdrawing a portion of the catalyst from the regenerator and then lifting the catalyst with a gas stream through a pipe passing through a water cooled heat exchanger and then returning the cooled catalyst to either the dilute catalyst phase in the regenerator or to the dense catalyst bed in the regenerator. In another embodiment, heat is removed continuously from the catalyst as it flows from the regenerator to the reactor by passing the heated catalyst through an indirect water cooled heat exchanger. In yet another embodiment internal cooling of the regenerator is provided by employing water cooled cyclone separators in the dilute phase of the regenerator vessel. In a still further technique water cooled coils located within the dense bed of the catalyst may be utilized to remove this excess heat from the regenerator vessel. Other techniques will be apparent to those skilled in the art and may be employed to return the temperature in the regenerator bed to its predetermined value.

The following example illustrates the process of this invention.

EXAMPLE

Figure 2:
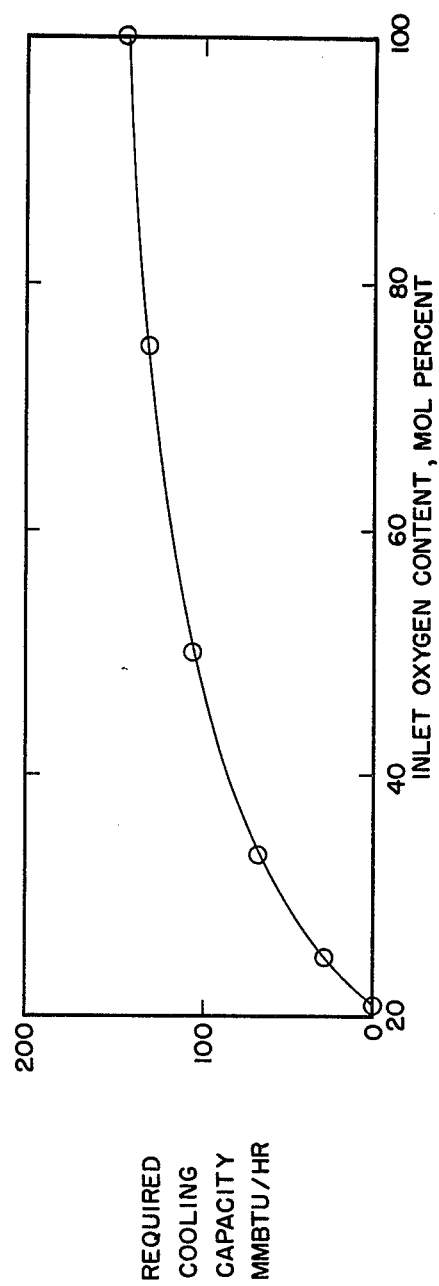
FIG. 2 shows the effect of the inlet oxygen content of regeneration gas on the cooling required to maintain a constant regeneration temperature.

The process of this invention will be illustrated utilizing a fluid catalytic cracking unit having a fresh feed capacity of 100,000 barrels per stream day. The coked catalyst is removed from the reactor and passed to the regenerator vessel where it is regenerated at a predetermined regenerator temperature of about 1295° F. By utilizing oxygen enrichment in accordance with the present invention and maintaining a constant regenerator superficial gas velocity, the regenerator temperature will be increased up to 68° F. in the theoretically limiting case of using pure oxygen. FIG. 1 shows that more reasonable levels of oxygen enrichment, such as 25 or 33 mole % oxygen, will increase the regenerator temperature by 13° and 31° F., respectively. In a similar fashion, FIG. 2 shows the cooling capacity required to maintain a constant regenerator temperature for various concentrations of inlet oxygen content in the regenerator gas. For example, at a 50 mole % oxygen content in the inlet regenerator gas, a cooling capacity in excess of 100,000,000 BTU's per hour is required to maintain the regenerator temperature at 1295° F. Catalyst coolers with a capacity of 30 to 144 million BTU's per hour are required for inlet oxygen concentrations ranging from 25 to 100%. Catalyst coolers of this capacity are well within the range of commercial fluid catalytic cracking experience.

Figure 3:
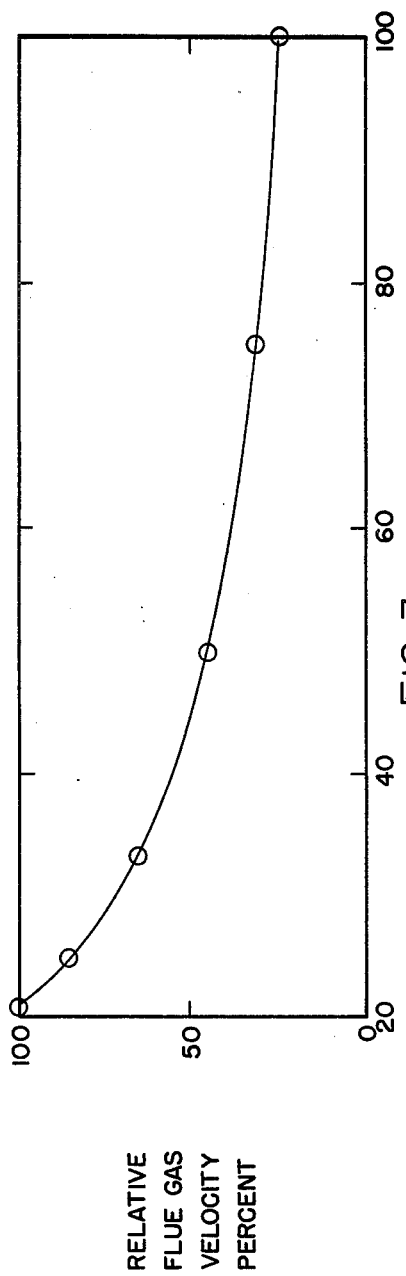
FIG. 3 shows the effect of inlet oxygen content on the relative flue gas velocity.

Assuming a constant oxygen flow rate and constant regenerator temperature, the regenerator flue gas velocity can be reduced significantly when utilizing the oxygen enrichment and catalyst cooling features of the subject invention. FIG. 3 shows that at inlet oxygen concentrations of 25 and 33 mole %, the regenerator flue gas velocity can be reduced by approximately 15 and 35%, respectively. Since catalyst losses from the regenerator cyclones vary approximately in proportion to the flue gas velocity raised to the third power, this oxygen enrichment would be equivalent to about 40 and 70% reductions in catalyst losses, respectively.

Figure 4:
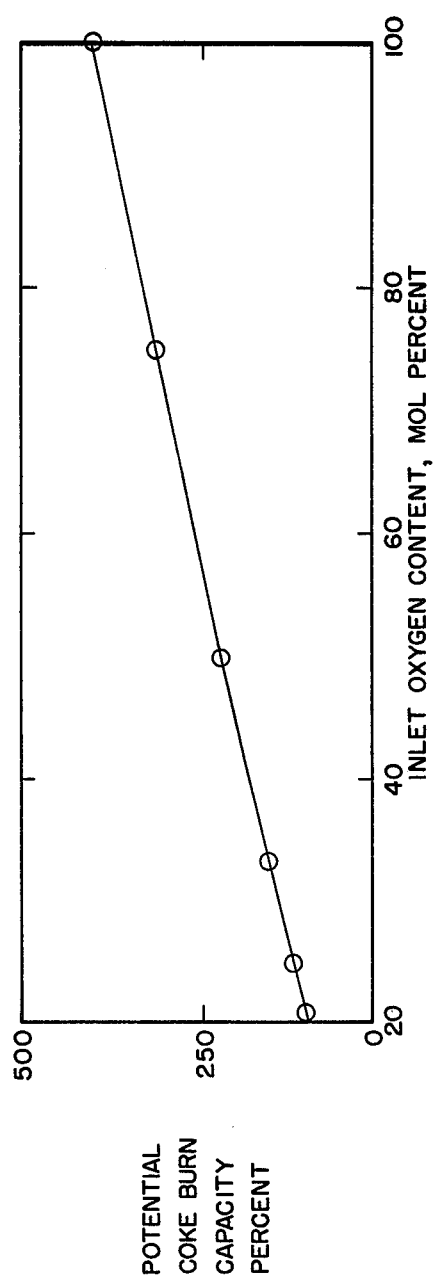
FIG. 4 shows the effect of inlet oxygen content of the regeneration gas on the coke burning capacity of the regenerator.

At constant regenerator flue gas velocity and constant regenerator temperature, the potential coke burning capacity can be increased in proportion to the inlet oxygen enrichment, up to a theoretical limit of 400% with pure oxygen. FIG. 4 shows the percentage increase in this potential coke burning capacity in relationship to the mole percent oxygen concentration of the regenerator inlet gas.

The overall potential benefits of FCC regeneration with the oxygen enrichment and catalyst cooling of this invention is summarized in Table 1 below. Based on fixed FCC operating conditions in the reactor and constant regenerator flue gas velocity and constant regenerator temperature, the practice of the present invention translates the increased coke burning capacity into increased fresh feed rate. Table 1 shows that oxygen enrichment of 23 and 26 mole % permit 10 and 20% increases in fresh feed rate, respectively. This requires between 280,000 and 570,000 SCFH of supplemental oxygen and 18 to 32 million BTU's per hour of catalyst cooling, respectively.

TABLE 1

| BENEFITS OF FCC REGENERATION WITH OXYGEN ENRICHMENT | | | | |
|---|---|---|---|---|
| | BASE CASE | +10% FEED | +20% FEED | +50% FEED |
| Potential Fresh Feed Rate, MB/SD | 100 | 110 | 120 | 150 |
| Potential Coke Make Rate, MLB/HR | 64.1 | 70.5 | 77.0 | 96.2 |
| OXYGEN ENRICHMENT REQUIRED | | | | |
| $O_2$ Concentration, Mol % | 21.0 | 23.2 | 25.5 | 32.3 |
| Supplemental $O_2$, MMSCFH | 0.0 | 0.28 | 0.57 | 1.41 |
| Total $O_2$, MMSCFH | 2.12 | 2.33 | 2.55 | 3.18 |
| Total $N_2$, MMSCFH | 7.98 | 7.72 | 7.45 | 6.67 |
| Total Gas-To-Regen., MMSCFH | 10.10 | 10.05 | 10.00 | 9.85 |
| REGENERATOR CATALYST COOLER | | | | |
| Duty Required to Maintain Constant Temperature, MMBTU/HR | 0 | 18 | 32 | 65 |

What is claimed is:

1. In a fluidized catalytic cracking process of the type wherein a hydrocarbon feedstock is contacted with cracking catalyst in a reactor vessel under catalytic cracking conditions producing cracked hydrocarbon vapors and coke-contaminated catalyst and wherein said coke-contaminated catalyst is regenerated in a regenerator vessel at a predetermined elevated temperature with air, utilized as a molecular oxygen-containing regeneration gas, passing through said regenerator vessel at a predetermined superficial velocity producing regenerated catalyst and a flue gas comprising oxides of carbon, the improvement which comprises:
   (a) introducing oxygen-enriched air into the regenerator vessel as the molecular oxygen-containing regeneration gas,
   (b) passing said oxygen-enriched air through said regenerator vessel at substantially the said predetermined superficial velocity, whereby the predetermined elevated temperature in the regenerator vessel is increased, and
   (c) cooling at least a portion of the regenerated catalyst from the increased elevated temperature to provide the regenerated catalyst at substantially the said predetermined elevated temperature.

2. The method of claim 1 wherein the oxygen-enriched air has an oxygen content of about 22 to about 35 mole percent.

3. The method of claim 1 wherein the portion of the catalyst is withdrawn from the regenerator vessel, cooled by indirect heat exchange and returned to the regeneration vessel.

4. The method of claim 1 wherein the portion of catalyst is cooled by indirect heat exchange with cooling coils located in the interior of the regenerator vessel.

5. The method of claim 1 wherein the portion of the catalyst is cooled by cooling the regenerated catalyst by indirect heat exchange as it passes from the regenerator vessel to the reactor vessel.

6. The method of claim 1 wherein the oxygen-enriched air has an oxygen content of about 23 to about 26 mole percent.

* * * * *